United States Patent [19]

Woytek et al.

[11] 4,091,081
[45] May 23, 1978

[54] PREPARATION OF NITROGEN TRIFLUORIDE

[75] Inventors: Andrew Joseph Woytek, Allentown; John Theodore Lileck, Tamaqua, both of Pa.

[73] Assignee: Air Products and Chemicals, Inc., Allentown, Pa.

[21] Appl. No.: 788,724

[22] Filed: Apr. 19, 1977

[51] Int. Cl.$^2$ ............................................. C01B 21/52
[52] U.S. Cl. ................................................... 423/406
[58] Field of Search ........................................ 423/406

[56] References Cited

U.S. PATENT DOCUMENTS 3,961,024   6/1976   Vitek ..................................... 423/406

FOREIGN PATENT DOCUMENTS 196,734   5/1967   U.S.S.R. .............................. 423/406

OTHER PUBLICATIONS

Morrow et al.; "Abstracts of Papers"; 137th Meeting, Amer. Chem. Soc. 1960, pp. 11M, 12M.

Primary Examiner—G. O. Peters
Attorney, Agent, or Firm—Russell L. Brewer; Barry Moyerman

[57] ABSTRACT

Nitrogen trifluoride is prepared by passing elemental fluorine in intimate contact with liquid phase ammonium acid fluoride maintained at a temperature above its melting point but below about 400° F for a time sufficient to effect reaction. Generally, ammonia is injected into the ammonium acid fluoride along with the fluorine to maintain a molar ratio of by-product hydrogen fluoride to ammonia of approximately 2.0 to 2.5.

8 Claims, 1 Drawing Figure

PREPARATION OF NITROGEN TRIFLUORIDE

BACKGROUND OF THE INVENTION

1. Field of the Invention

This invention relates to a process for preparing nitrogen trifluoride ($NF_3$). Nitrogen trifluoride normally is a colorless gas having a boiling point of about $-129°$ C and a melting point of about $-208°$ C. It is useful as a fluorine source in the preparation of fluorocarbons, especially fluoroolefins or as an oxidizer for high energy fuels. It has advantages over elemental fluorine as a fluorine source in that it is relatively inert at low temperatures, e.g. 70° F, whereas fluorine is not. Further, it can be compressed to high pressures, e.g. 1,000 psig for shipment.

2. Description of the Prior Art

U.S. Pat. No. 3,304,248 discloses a process for forming nitrogen trifluoride by passing gaseous nitrogen through a plasma arc at a temperature in excess of 1,000° C and introducing gaseous elemental fluorine into the post arc region as near the anode as possible. The molar ratio of nitrogen to fluorine during such process is maintained in excess of 0.4:1.

U.S. Pat. No. 3,055,817 discloses a process for producing nitrogen trifluoride by reacting hydrazoic acid gas ($HN_3$) with oxygen difluoride ($OF_2$) in the presence of actinic (ultraviolet) radiation.

U.S. Pat. No. 4,001,380 discloses an improved process for preparing nitrogen trifluoride from $FN_3$ by reaction with nitrosyl fluoride or chlorine trifluoride at a temperature above the boiling point of fluorine azide but below 100° C.

U.S. Pat. No. 3,043,662 discloses a process for preparing nitrogen trifluoride by reacting carbon tetrafluoride or carbonyl fluoride with binary oxides of nitrogen, e.g. nitrous, nitric and nitrogen oxide. The reaction is carried out by passing the gases through an electric arc at a temperature of 2,000° to 4,000° C for a period of 0.001 to about 2 seconds.

The article "Fluorination of Ammonia" 82 J. AM. CHEM. SOC. 5301-4 (1960) discloses the synthesis of nitrogen trifluoride by the direct vapor phase fluorination of ammonia using molar ratios of ammonia to fluorine of from about 1.1–2:1. The reaction temperatures for the vapor phase process were not disclosed, but the authors reported yields of from about 10 to 25% $NF_3$ based on fluorine. Some of the problems associated with this particular process are (a) the competing decomposition reaction of nitrogen trifluoride to nitrogen and hydrogen fluoride, (b) heat removal and temperature control, and (c) the generation of ammonium fluoride which can cause plugging in the recovery system downstream.

The fluorination of ammonium fluoride at a temperature of about 20°–70° C, optionally in the presence of sodium chloride, is shown in 13 RUSSIAN JOURNAL OF INORGANIC CHEMISTRY 1618–1619 (1968).

U.S. Pat. Nos. 3,235,474 and 3,356,454 disclose a process for preparing nitrogen trifluoride, with some by-product dinitrogen difluoride. These processes contemplate the electrolysis of ammonium acid fluoride at a temperature above its melting temperature, along with simultaneous injection of hydrogen fluoride. The basic idea in these patents is to avoid the generation of an explosive atmosphere which results because of by-product hydrogen being produced at the anode, and this is done by maintaining the nitrogen fluoride at a concentration lower than 9.4% or greater than 95%.

SUMMARY OF THE INVENTION

This invention contemplates the generation of nitrogen trifluoride by the direct fluorination of ammonium acid fluoride. In this process, elemental fluorine is contacted with liquid phase ammonium acid fluoride for a time sufficient for the fluorine to react with the ammonium acid fluoride (presumably ammonia which is generated in situ), to form product nitrogen trifluoride. Generally, ammonia is injected into the molten ammonium acid fluoride bath simultaneously with the addition of fluorine to maintain a molar ratio of by-product hydrogen fluoride to ammonia of at least 2.0.

The generation of nitrogen trifluoride by the process disclosed herein has many advantages over the prior art, particularly when operated under the optimum conditions as noted in the examples. These advantages include:

the ability to produce product $NF_3$ in reasonably high yield, with excellent conversion of fluorine to product;

the ability to produce a product essentially free of dinitrogen difluoride and other contaminats;

the ability, when operating at molar ratios of hydrogen fluoride to ammonia of two or greater, to avoid the formation of ammonium fluoride contaminant as it is converted to ammonium acid fluoride thereby resulting in less plugging of equipment in the recovery operation;

the ability to carry out a highly exothermic fluorination reaction without forming a flammable or explosive hydrogen-containing atmosphere; and the ability to control process temperature much closer than in the electrolytic process because of the elimination of substantial heat, i.e., 370 kilocalories per mol fluorine passed through the system.

BRIEF DESCRIPTION OF THE DRAWING

The single FIGURE is a schematic flow diagram of the overall process for producing $NF_3$ by the fluorination of ammonium acid fluoride.

DESCRIPTION OF THE PREFERRED EMBODIMENTS

Figure 1:
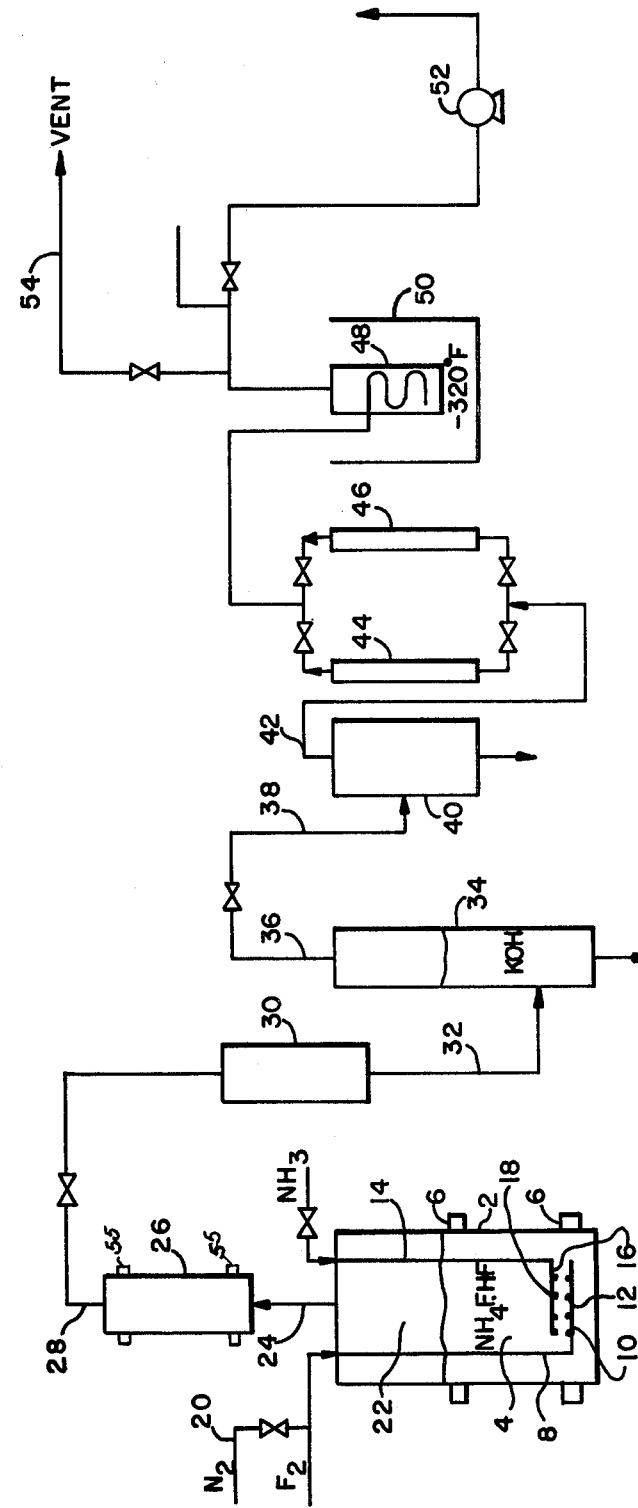

In practicing the process of this invention, elemental fluorine is passed through liquid phase ammonium acid fluoride. Typically, the reaction is carried out at above the melting point of ammonium acid fluoride of approximately 260° F (may vary with the concentration of HF) and below about 400° F. Preferably, the ammonium acid fluoride salt is maintained at a temperature of about 260° to 320° F during fluorination in order to obtain enhanced yields of nitrogen trifluoride and to reduce the loss of nitrogen trifluoride through decomposition by possible reaction with ammonia.

Although not intending to be bound by theory, it is believed one of the reasons why ammonium acid fluoride can enhance the yield of nitrogen trifluoride is that it acts as a heat sink for the highly exothermic fluorination reaction

The three moles ammonium fluoride formed react substantially immediately with 3 moles by-product HF to generate more ammonium acid fluoride thereby leaving 5 moles HF by-product per 4 moles NH₄F.HF charged.

Experimental evidence indicates that if the heat is not removed substantially immediately as the NF₃ is formed, and the localized temperature about the NF₃ is high, the reaction $$2NH_4F \cdot HF + 3F_2 \rightarrow N_2 + 10HF$$

or alternatively $$NF_3 + NH_4F \cdot HF \rightarrow N_2 + 5HF$$

may occur. These latter competing reactions are minimized by the excellent heat removing capacity of the ammonium acid fluoride.

To effect fluorination, the elemental fluorine is passed in intimate relationship with the ammonium acid fluoride to form NF₃. It is desirable to finely disperse the fluorine vapor in the bath of molten ammonium acid fluoride to avoid hot spots. This is accomplished by passing the fluorine gas through a sparger. Spargers used have a plurality of holes, generally of uniform diameter which are from about 1/64 to ¼ inch. Alternatively stated, the holes have a cross-sectional area of from about 0.0001 to about 0.05 in² which will include triangular and rectangularshaped holes. Spargers of this type are commonly in the form of a straight pipe or a circular ring. Another form of sparger is made of a sintered metal and in these instances, the pores are in the micron range.

In a preferred embodiment, the fluorine is passed through a sparger having a plurality of holes less than ⅛ inch in diameter or less than 0.012 in² in cross-sectional area and then into a packed bed column vertically disposed in the reactor bath where the fluorine is dispersed even further. These packed columns generally are about 1½-3 inches in diameter and from about 6-18 inches in length. They are packed with screen wire or other conventional packing. An advantage of this type sparging assembly is that not only is the fluorine finely dispersed, heat transfer is enhanced by a thermosyphoning of ammonium acid fluoride through the packed column.

The elemental fluorine is injected into the bed of ammonium acid fluoride at a depth of generally about ½ to 4 feet below its surface at a volume rate of approximately 2 to 20 scfh (standard cubic feed per hour) and preferably 6-15 scfh. This is equivalent to about 0.2 to 2.0 pounds fluorine per square foot of cross-sectional area of ammonium acid bath. It should be noted that the flow can be concentrated within the bath as for example in the packed bed column, but the volume of fluorine passed through the unit is controlling. The depth is not critical as generally once the temperature of the NF₃ is reduced to bath temperature, it is relatively stable. It is unstable when localized temperatures may exceed bath temperatures. This flow rate employed not only provides for sufficient reaction time (which is relatively short), but it provides a mechanism whereby the fluorine is evenly dispersed throughout the ammonium acid fluoride bath for providing mild agitation to the bath to enhance heat transfer and permit removal of heat formed on generation of the NF₃ product. The fluorine introduced into the ammonium acid bath can be in its pure state or can be diluted with an inert diluent such as helium, neon, or nitrogen as the case may be. However, flow rates are measured on the basis of fluorine charged and not on the combined value of diluent and fluorine charged. In preferred operation, the fluorine concentration is at least 50% by volume, and preferably greater than 85% by volume.

Ammonia is injected into the ammonium acid bath, generally on a continuous basis, to provide makeup ammonia for the reaction. In analyzing the overall reaction from the previous equations, it is clear that 1 mole of ammonia is consumed for each mole of nitrogen trifluoride product produced. This mole of ammonia must be replaced to effect reaction on a continuous basis either by addition of ammonium acid fluoride, ammonium fluoride or ammonia.

In practicing the invention, the ammonia is introduced via a sparger. It is not as critical to disperse the ammonia, as intimately as the fluorine, as ammonia presumably is generated in situ by the decomposition of ammonium acid fluoride. In preferred operation, ammonia is introduced to the reaction in an excess amount to provide a hydrogen fluoride to ammonia mole ratio of at least 2 and preferably 2.0 to 2.5 moles HF per mole NH₃. (The ammonia to HF ratio is determined by analysis of the liquid bath.)

The ammonia not only provides additional reactant as mentioned before, it performs a secondary function, and that is to consume HF to form ammonium acid fluoride thereby reducing the volume of HF that is sent to the product recovery system. Generally, the concentration of HF is about 10 to 15% by volume of the reactor gas going to the product recovery unit, and if higher concentrations of HF to ammonia were tolerated, the volume percent of HF would rise substantially and would have to be removed in the product recovery unit.

The temperature of fluorination can vary from the melting point of ammonium acid fluoride, which can be lowered by permitting increased concentrations of hydrogen fluoride, to a maximum of 400° F. The lower temperature then, is the liquefaction temperature of the ammonium acid fluoride, which preferably is a temperature of at least 150° F, and more preferably, at least 280° F. Generally, a temperature not exceeding about 320° F is employed which thus defines a preferred range of from 280° F to 320° F.

The following examples are provided to illustrate preferred embodiments of this invention and are not intended to restrict the scope thereof.

EXAMPLE 1

In referring to FIG. 1, 6 pounds of ammonium acid fluoride are charged to nickel reactor 2 (laboratory size) which is approximately 4 inches in diameter, and 3 feet high. The ammonium acid fluoride 4 is heated to a temperature of about 275° F to effect melting thereof external heating coils 6. A fluorine sparger 8, which is made of nickel, is introduced through the top of reactor 2 and immersed approximately 12 inches below the surface of the ammonium acid fluoride. It is capped with a circular ring end portion 10 having a plurality of substantially uniform holes 12 which are approximately 1/32 of an inch in diameter. An ammonia sparger 14 is introduced through the top of reactor 2 and below the surface of the ammonium acid fluoride. It has an end portion 16 with a plurality of holes 18 of substantially uniform diameter. These holes also are approximately 1/32-inch in diameter.

Fluorine, which is approximately 99% pure with residual impurities of nitrogen, carbon tetrafluoride, and hydrogen fluoride is introduced into the ammonium acid fluoride bath 4 at a rate of about 1.0 scfh. Nitrogen is introduced through line 20 to sparger 8 at 1 scfh to dilute the fluorine to about 50% by volume. Ammonia is introduced through line 14 to maintain a ratio of by-product HF to ammonia of approximately 2.3:1 as measured in liquid 4. The pressure in reactor 2 is maintained at about 6 psig.

The reactor gas in space 22 is passed through line 24 through a mist eliminator unit 26 for delivery to the $NF_3$ recovery unit. The mist eliminator unit 26 is held at a temperature greater than 260° F by heater 55 and is used to effect removal of entrained melt in the gas stream and reaction of ammonium fluoride with hydrogen fluoride to produce liquid phase ammonium acid fluoride which then can fall back into reactor 2. After the reactor gas has passed through mist eliminator unit 26, the gas stream is passed through line 28 to a conventional recovery system.

Typically in the recovery process, the reactor gas is passed through trap 30 and then by line 32 to scrubber 34 which contains potassium hydroxide. There in scrubber 34, HF reacts with the KOH to form a salt and is removed from the system. Thereafter, the gas is removed by line 36 and sent to a cold trap 40. There the temperature is reduced to about 40° F for condensing a substantial proportion of water, and then through line 42 to alternate molecular sieve dryers 44 and 46 for removing all traces of water. Thereafter, the temperature of the gas is cooled to liquid nitrogen temperatures (−320° F) in condenser 48 for condensing substantially all of the nitrogen trifluoride in the gas stream. Crude product is collected in the bottom of condenser 48 and placed under a vacuum via pump 52 to remove residual nitrogen from the liquefied product. This nitrogen is vented through line 54. The product then is warmed and sent to storage.

In a first run, through a lab unit similar in design to FIG. 1, approximately 220 grams or 4.9 scf fluorine were fed to reactor 2 over a 5-hour period and 51.5 grams of purified $NF_3$ were collected. The yield was approximately 37% $NF_3$ based on fluorine, and the analysis of the final product was greater than 95% $NF_3$ by weight.

In a second run, a total of 142 grams of fluorine were charged over a five hour period and 88.7 grams of purified $NF_3$ were collected. The yield in this run was approximately 63% based on fluorine charged. The large difference in yield was due primarily to analysis and experimental error. However, in any case, yields were deemed good given the analytical and experimental methods available.

EXAMPLE 2

A procedure similar to that of Example 1 was followed except that a pilot plant scale reactor and different sparging assembly was used in place of reactor 2 and sparger 8 as shown. This reactor had a diameter of 14 inches and a height of about 2 feet to provide 2 cubic feet of volume. The sparger assembly comprised a straight pipe having nine holes of 1/32-inch diameter and a packed cylindrical column 2 inches in diameter and 6 inches in height. The cylindrical column was placed over the straight pipe sparger and vertically disposed within the reactor. It was packed with sufficient Monel York mesh screen wire to enhance further break-up of bubbles emitted from the pipe without substantially restricting liquid flow through the column. Approximately 134 pounds of ammonium bifluoride were charged to this reactor and heated to a temperature of 260° F. The surface of the resulting liquid ammonium acid fluoride was about 6 inches above the sparger. At this time, 50 standard scf of 100% fluorine and 50 scf of nitrogen were mixed and then charged over 9 hours. The yield of $NF_3$ for 9 hours operation was approximately 31% based on fluorine charged.

At 270° F and a flow rate of 6.0 CFH (cubic feet per hour), 7.0 CFH helium and 1.5 CFH $NH_3$ with a reactor pressure of 5 psig to maintain an $HF/NH_3$ ratio of about 2.25 to 2.31:1 a 41% yield of $NF_3$ was obtained and $N_2F_2$ was less than 100 ppm. Analysis of the reactor gas prior to scrubbing was about 7.7% by volume, the remainder primarily being helium and nitrogen.

At a flow rate of 10 CFH $F_2$, 3 CFH $NH_3$ and 10 CFH HE, a reactor temperature of 275° F and pressure of 6 psig a yield of 41.5% $NF_3$ was obtained, and the $N_2F_2$ was less than 100 ppm.

At a flow rate of 15 CFH $F_2$, 15 CFH $NH_3$, 15 CFH HE, a temperature of 275° F and an $HF/NH_3$ mole ratio of 2.17–2.23 a yield of 32.1% $NF_3$ was obtained.

The above tests show that a flow rate of from about 6–15 CFH $F_2/ft^2$ of reactor produces moderately good yields and as the value of $F_2$ is increased above about 10 CFH yields start to drop. These tests also show an ability to produce a product substantially free of dinitrogen difluoride contaminant.

EXAMPLE 3

The procedure of Example 2 was followed except that a fluorine nitrogen mixture containing 86% fluorine was used as the charge gas. The yield, based on fluorine charged, was about 44%.

EXAMPLE 4

The procedures of Examples 2 and 3 were followed except 100% $F_2$ was charged as the feed gas. The yield was about 53%. These runs in Examples 2, 3 and 4 show that slightly better yields are obtained when 100% $F_2$ is used as the reactor gas as opposed to a somewhat diluted fluorine mixture.

EXAMPLE 5

The procedure of Example 2 was followed for a first series of runs except that 100% $F_2$ was used and the flow rate maintained at 5 scfh, and the reaction temperature was adjusted from a temperature of 240° to 281° F. Under a second series of runs, the temperature was varied from 294°–366° F while the flow rate of 100% $F_2$ was 3 scfh. The packed bed height was 12 inches.

The yields for these runs were as follows:

| Temp. ° F | ° $NF_3$ Yield Based on Fluorine Charge | % $F_2$ Conversion |
|---|---|---|
| 240 | 21.7 | |
| 262 | 29.6 | |
| 272 | 32.2 | |
| 281 | 34.9 | |
| 294 | 57.9 | 83.8 |
| 303 | 56.1 | 71.8 |
| 313 | 40.3 | 90.6 |
| 333 | 12.3 | 93.2 |
| 352 | 4.2 | 99.6 |
| 366 | 4.8 | 94.1 |

These results show that temperature has an effect on yield and generally, as temperatures are maintained below about 260° or above 320° F, the yields fall off dramatically.

What is claimed is:

1. A process for preparing nitrogen trifluoride which comprises the step of contacting elemental fluorine in vapor phase with liquid phase ammonium acid fluoride maintained at a temperature of from about the melting temperature to a temperature not substantially above 400° F for a time sufficient to effect reaction and thereby form nitrogen trifluoride.

2. The process of claim 1 wherein said contacting of fluorine with said ammonium acid fluoride is effected by passing the fluorine through a sparger having a plurality of holes therein not substantially larger than about 0.5 inch² in cross-sectional area.

3. The process of claim 2 wherein ammonia is injected into the liquid phase ammonium acid fluoride.

4. The process of claim 3 wherein a mole ratio of by-product hydrogen fluoride to ammonia of at least 2.0 is established and maintained while fluorine is passed through the liquid phase ammonium acid fluoride.

5. The process of claim 5 wherein ammonia is injected into the ammonium acid fluoride in a proportion sufficient to maintain a mole ratio of hydrogen fluoride to ammonia of about 2:0 to 2:5.

6. The process of claim 5 wherein said fluorine is charged to the ammonium acid fluoride at a rate of from about 2 to about 20 standard curbic feet per hour per square foot of cross-sectional area of said liquid phase ammonium acid fluoride bath.

7. The process of claim 6 wherein said ammonium acid fluoride is maintained at a temperature of from about 260° to 320° F, and the pressure in said fluorination is from about atmospheric to about 50 psig.

8. The process of claim 7 wherein said fluorine is passed through a sparger and then through a packed column having a diameter of from about 1½–3 inches, and a height of about 6–18 inches vertically disposed in said reactor.

* * * * *